(12) United States Patent
Stiefenhofer

(10) Patent No.: US 9,438,040 B2
(45) Date of Patent: Sep. 6, 2016

(54) ENERGY SUPPLY SYSTEM AND CONDUCTOR LOOP ENCLOSURE

(71) Applicant: sonnen GmbH, Wildpoldsried (DE)

(72) Inventor: Torsten Stiefenhofer, Wildpoldsried (DE)

(73) Assignee: sonnen GmbH, Wildpoldsried (DE)

( * ) Notice: Subject to any disclaimer, the term of this patent is extended or adjusted under 35 U.S.C. 154(b) by 449 days.

(21) Appl. No.: 14/058,843

(22) Filed: Oct. 21, 2013

(65) Prior Publication Data

US 2015/0108845 A1 Apr. 23, 2015

(51) Int. Cl.
*H02J 3/32* (2006.01)
*H02G 3/08* (2006.01)
*H02G 3/10* (2006.01)
*H02J 7/00* (2006.01)
*H02J 7/35* (2006.01)

(52) U.S. Cl.
CPC ............. *H02J 3/32* (2013.01); *H02G 3/088* (2013.01); *H02G 3/10* (2013.01); *H02J 7/0068* (2013.01); *H02J 7/35* (2013.01); *Y10T 307/696* (2015.04)

(58) Field of Classification Search
CPC ........... H02J 3/32; H02G 3/088; H02G 3/10; H02M 1/00; H02M 7/538
See application file for complete search history.

(56) References Cited

U.S. PATENT DOCUMENTS 5,384,792 A * 1/1995 Hirachi ............... G06F 11/2015
307/64

* cited by examiner

*Primary Examiner* — Kenneth B Wells
*Assistant Examiner* — Rafael Pacheco
(74) *Attorney, Agent, or Firm* — Sughrue Mion, PLLC

(57) ABSTRACT

An energy supply system for supplying electrical energy to a building, comprising a grid connector unit for providing a connection to an external power grid, a load connector unit for connecting to a building power grid, a conductor loop for electrically connecting the grid connector unit to the load connector unit, an energy storage device connected to the conductor loop, and a disconnector placed in the conductor loop for, upon activation of the disconnector, disconnecting the electrical connection between the grid connector unit and the load connector unit, whereby the energy storage device is connected to the conductor loop via a discharging line such that electrical energy stored in the energy storage device may be discharged through part of the conductor loop to the load connector unit when the disconnector is activated.

18 Claims, 4 Drawing Sheets

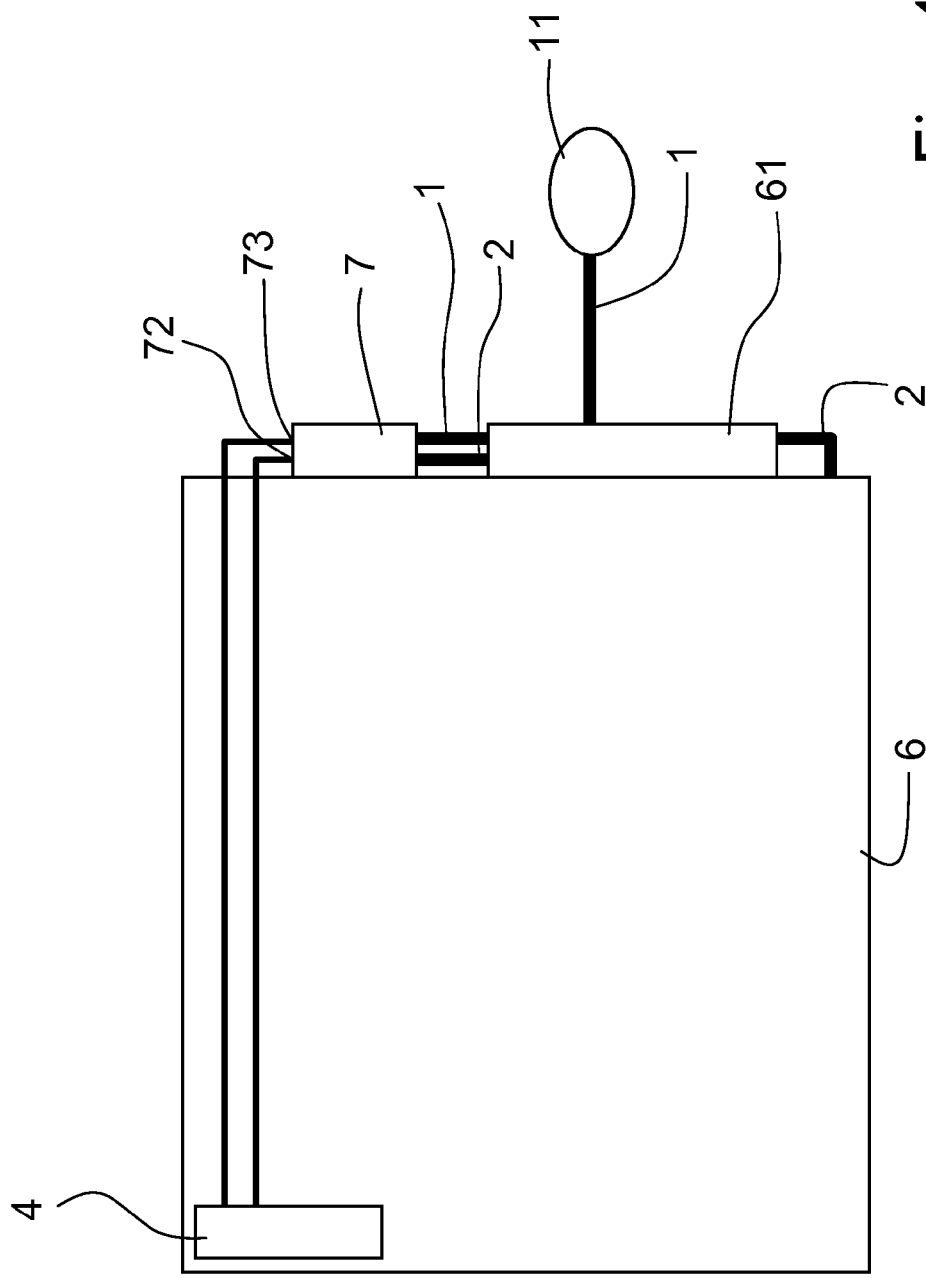

ENERGY SUPPLY SYSTEM AND CONDUCTOR LOOP ENCLOSURE

FIELD OF THE INVENTION

The invention relates to an energy supply system for supplying electrical energy to a building, whereby the energy comes from an external power grid and from an alternative energy source, such as from a photovoltaic device, comprising an energy storage device such as a battery for storing electrical energy and providing the stored electrical energy to an internal building grid when needed.

BACKGROUND OF THE INVENTION

More and more firms, but also private individuals, are installing alternative energy sources, such as wind turbines or photovoltaic devices, on the premise of their buildings or attached to the buildings themselves, for example on their roofs. Such energy sources may be used to satisfy their own needs for electrical power, and in addition to feed excess electrical power produced by the alternative energy source to the external power grid. When installing an alternative energy source, usually, an energy storage device is also installed at the site to store some of the excess electrical energy provided by the alternative energy source in order to utilize the stored energy at a different time. For example, on very sunny days, a photovoltaic device might produce much more energy than can be consumed by the user. This excess energy may be partly used to charge the energy storage device, such as a battery system, and partly fed into the external power grid. During the night, or on less sunny days, when the electric power produced by the photovoltaic device is not sufficient for the user's needs, the energy stored in the energy storage device may be utilized to power the building either exclusively or in addition to energy taken from the external grid.

An energy supply system providing such an energy storage device is usually very complex. This is because the wiring of such an energy storage device to the in-hose electric grid and to the external power grid through the building connection box can be quite intricate. There is the danger of accidentally feeding electrical energy either from the alternative energy source or from the energy storage device into the external power grid in an undesirable way or at an undesirable time when the wiring is not done properly. In other cases, a badly wired system might damage or even destroy components of the energy supply system. Furthermore, to ensure proper wiring and setup, the system becomes expensive.

It is the object of the present invention to overcome these disadvantages and obstacles and provide for a more reliable energy supply system, which is simpler and more cost effective to set up.

SUMMARY OF THE INVENTION:

In order to achieve the above-mentioned object, according to one aspect of the invention, an energy supply system is provided for supplying electrical energy to a building. The energy supply system comprises a grid connector unit, a load connector unit, a conductor loop, an energy storage device, and a disconnector placed in the conductor loop. The grid connector unit provides a connection to an external power grid such as the city power grid, although it can also be a company area power grid. The load connector unit provides a connecting to a building power grid, i.e. an internal power grid inside an office building or a house, to which appliances may be connected, such as refrigerators, dishwashers, televisions, and the like. The grid connector unit and the load connector unit may comprise conductor leads coming from a building or house connection box, also called a service box or service switch cabinet, which may either be placed inside the building, for example in the basement, or outside the building, for example attached to an outside wall of the building. When installing the energy supply system, the technician may locate the connection line inside the building connection box, which connects the internal building grid to the outside power grid, cut the found connection line, and attach terminal connectors to the resulting lead ends.

The conductor loop electrically connects the grid connector unit to the load connector unit. In the example above, the technician, after cutting the connection line, will therefore reconnect the cut electrical connection through the conductor loop. The conductor loop can be an integral part of a pre-fabricated energy supply system. Therefore, the installation of the energy supply system may be completed by this simple process, at least as far as it encompasses interference with the building connection box.

The disconnector, placed in the conductor loop, is constructed such that upon its activation, it disconnects the electrical connection between the grid connector unit and the load connector unit produced by the conductor loop. Thus, by activating the disconnector, electrical power to the internal building grid is no longer supplied by the external power grid. Instead, the electrical energy is supplied entirely by the energy storage device, which is connected to the conductor loop via a discharging line. For this, the discharging line connects to the conductor loop preferably at a location between the disconnector and the load connector unit, in order to assure that electrical energy stored in the energy storage device may be discharged through part of the conductor loop to the load connector unit, even when the disconnector is activated. The electrical energy stored in the energy storage device may be discharged through part of the conductor loop to the load connector unit also in the situation in which the disconnector is inactive, in which case the conductor loop is not interrupted. In this case, the electrical energy consumed in the building is supplied partly through the external grid and partly by the energy storage device.

Besides a battery unit, the energy storage device may comprise inverters or inverted rectifiers, control units, measurement devices, transformers, power management units and/or other necessary or useful components.

In an advantageous embodiment, the conductor loop is partially or entirely placed inside a loop enclosure. When only a part of the conductor loop is placed inside the loop enclosure, the enclosed part is preferably a larger portion of the entire conductor loop, compared to the length of the conductor loop. The loop enclosure may be a box, such as a junction box, protecting the conductor loop. The enclosure may be made of metal or another suitably robust material. Advantageous embodiments of the loop enclosure are described in more detail below.

According to a preferred embodiment, the disconnector or an output power measurement device measuring the power reaching the load connector unit or both the disconnector and an output power measurement device are placed inside the loop enclosure. This has the advantage that a technician may not need to handle the disconnector or the output power measurement device directly, when installing the system. Instead, these elements are already connected to the conductor loop.

According to advantageous embodiments, the load connector unit, the conductor loop, the disconnector, the electrical connection between the energy storage device and the conductor loop and/or the output power measurement device are constructed as one-phase, two-phase, three-phase or multi-phase elements. The entire energy supply system may preferably be constructed as a one-phase or a three-phase system. In the case of a three-phase system, any one or more of the above elements, in particular the output power measurement device, may still be constructed as a one-phase element, for example for cutting costs and providing a simpler system. In particular, when the entire system is a three-phase system, it may still be operated as a one-phase system, when the disconnector is activated and the system is thus operated off-grid.

Preferably, the disconnector is an all-phase disconnector. In the case of a three-phase system, this means that upon activation, the disconnector will separate all three conductive leads forming the conductor loop, such that the entire system is operated off-grid. This is in particular useful when utilizing the energy storage device for power backup in case of a power outage. In order to ensure that the energy storage device is not discharging into the external power grid, there has preferably to be an all-phase disconnection.

In an advantageous embodiment, the energy supply system further comprises a grid voltage monitoring device for monitoring the voltage level at the grid connector unit. The result of the monitoring may be the decision that the grid voltage measured at the grid connector unit is too small to continue charging the energy storage device. This voltage monitoring device is preferably placed inside the energy storage device. For connecting the voltage monitoring device to the grid connector unit, a charging line of the energy storage device may be employed, which connects the energy storage device to the conductor loop at the grid connector unit side of the disconnector. Alternatively, the voltage monitoring device may comprise a low voltage alarm device, which notifies the energy storage device in case the voltage level at the grid connector unit falls under a certain minimum level.

The voltage monitoring device may be utilized for monitoring the voltage at the grid connector unit. If the voltage at the grid connector unit breaks down or if the voltage level becomes too low, either due to a power outage at the external grid or for example due to a shut-off in order to perform maintenance work, this will be registered by the voltage monitoring device. In response to this event, the disconnector may advantageously be activated in order to separate the grid either partially or completely (in case of an all-phase disconnector) from the load connector unit through the conductor loop. In this case, the entire electric energy for the building may come from the energy storage device functioning as an emergency power supply. Preferably, the disconnector is controlled by the energy storage device in dependence of the result of the monitoring of the voltage level. That means that the energy storage device either incorporates the voltage monitoring device or it obtains the results from the voltage monitoring device and in turn activates or deactivates the disconnector accordingly.

According to an advantageous embodiment, the energy storage device is connected to the conductor loop via a charging line such that the connection to the conductor loop is not disconnected when the disconnector is activated. For this, the charging line is preferably connected to the conductor loop at a point between the grid connector unit and the disconnector. The energy storage device may be charged with electrical energy coming from the external grid through the grid connector unit. In certain embodiments, the charging line may be replaced by a voltage monitor line, through which the energy storage device monitors the voltage at the grid connector unit. In other embodiments, the charging line may also be utilized as voltage monitor line for this purpose.

In a preferred embodiment, the loop enclosure is constructed to be located in an outside environment. This would allow the loop enclosure to be mounted on an outside wall of the building, for example in proximity to the service box, if the service box is located outside of the building, which may be the case for private houses. For this purpose, the loop enclosure may comprise an encasing that is tight against dust, airtight and/or watertight. Preferably, the loop enclosure satisfies an appropriate Ingress Protection (IP) Rating, such as IP65.

In preferred embodiments, the conductor loop is constructed for a larger current throughput, than the discharging line or any electrical connecting line connecting the energy storage device to the conductor loop, e.g. larger by more than 30%, more than 50%, or more than 70%. In other words, the conductor loop may have a higher ampacity or current-carrying capacity, than any electrical connecting line, such as the charging line or discharging line, leading from the energy storage device to the conductor loop. This can be achieved by having a charging line or discharging line with a smaller cross section than the conductor loop.

In an advantageous embodiment, a load side connected photovoltaic device is provided. That means that electricity produced by the photovoltaic device, in particular a wall mounted or roof mounted solar cell module, is connected to the load side of the energy supply system, which is the side connected to the load connector unit. Therefore, in this embodiment, the photovoltaic device feeds directly into the internal building grid. In case of an activated disconnector, no additional steps are required in order to obtain an autarkic or self-sustaining system, where the entire electricity for the building comes from the photovoltaic device and/or the electrical energy storage.

In an alternative embodiment, the energy supply system comprises a grid side connected photovoltaic device and a switch unit constructed for switching the connection of the photovoltaic device from a grid side connection to a load side connection when the disconnector is activated. That means that instead of having the photovoltaic device connected to the load connector side, it is connected to the grid connector side and is feeding into the internal building grid only through the conductor loop. I this case, when the disconnector is activated and the electrical connection through the conductor loop is interrupted, the internal building grid will also be cut from the photovoltaic device. In order to ensure a self-sustaining system as defined above, the electrical output of the photovoltaic device will have to be switched to the load side connection with the help of a switch.

In any of the cases described above, the photovoltaic device may, in addition to the photovoltaic elements such as solar cells, comprise inverters or inverted rectifiers, control units, measurement devices, transformers, power management units and/or other necessary or useful components.

When the energy supply system is installed at a building, the loop enclosure is advantageously placed at the outside of the building and the energy storage device is preferably placed inside of the building. Placing the energy storage device inside the building has the advantage that it does not need to be enclosed for protection against an outside environment. Advantageously, the space, in which the energy storage device is located, already supplies the right climate, in which case there is no need to cool or heat the energy storage device in an appropriately sealed enclosure.

According to a further aspect of the invention, a loop enclosure is provided, which entirely or partly encloses a conductor loop and a disconnector. The loop enclosure comprises grid connector terminals, load connector terminals, charging line terminals and/or discharging line terminals. These terminals lead out of the loop enclosure, and allow a technician to connect the loop enclosure to a grid connector unit, to a load connector unit and to an electrical storage device, respectively. Any number of the terminals, preferably all of these terminals provided at the loop enclosure, are constructed as three-phase terminals, although it may be advantageous to have one or more of said terminals constructed as single-phase or two-phase terminals. In the loop enclosure, the enclosed conductor loop electrically connects the grid connector terminals to the load connector terminals, and the disconnector is constructed to, upon activation, disconnect the electrical connection between the grid connector terminals and the load connector terminals. Furthermore, a discharging line electrically connects the conductor loop and the discharging line terminals, even when the disconnector is activated.

Other aspects and embodiments of the loop enclosure have already been discussed above in connection with the energy supply system, such as the loop enclosure being constructed for mounting at an outside of a building or the loop enclosure enclosing an output power measurement device for measuring the power leaving the enclosure through the load connector terminals.

BRIEF DESCRIPTION OF THE DRAWINGS

The present invention will be explained in more detail in the following text with reference to preferred embodiments of an energy supply system according to the invention, which are illustrated in FIG. 1 through FIG. 4 and are not intended to be restrictive.

FIG. 4 shows a schematic diagram depicting the placement of the different elements of an energy supply system with respect to a building in accordance to a preferred embodiment.

DETAILED DESCRIPTION

Figure 1:
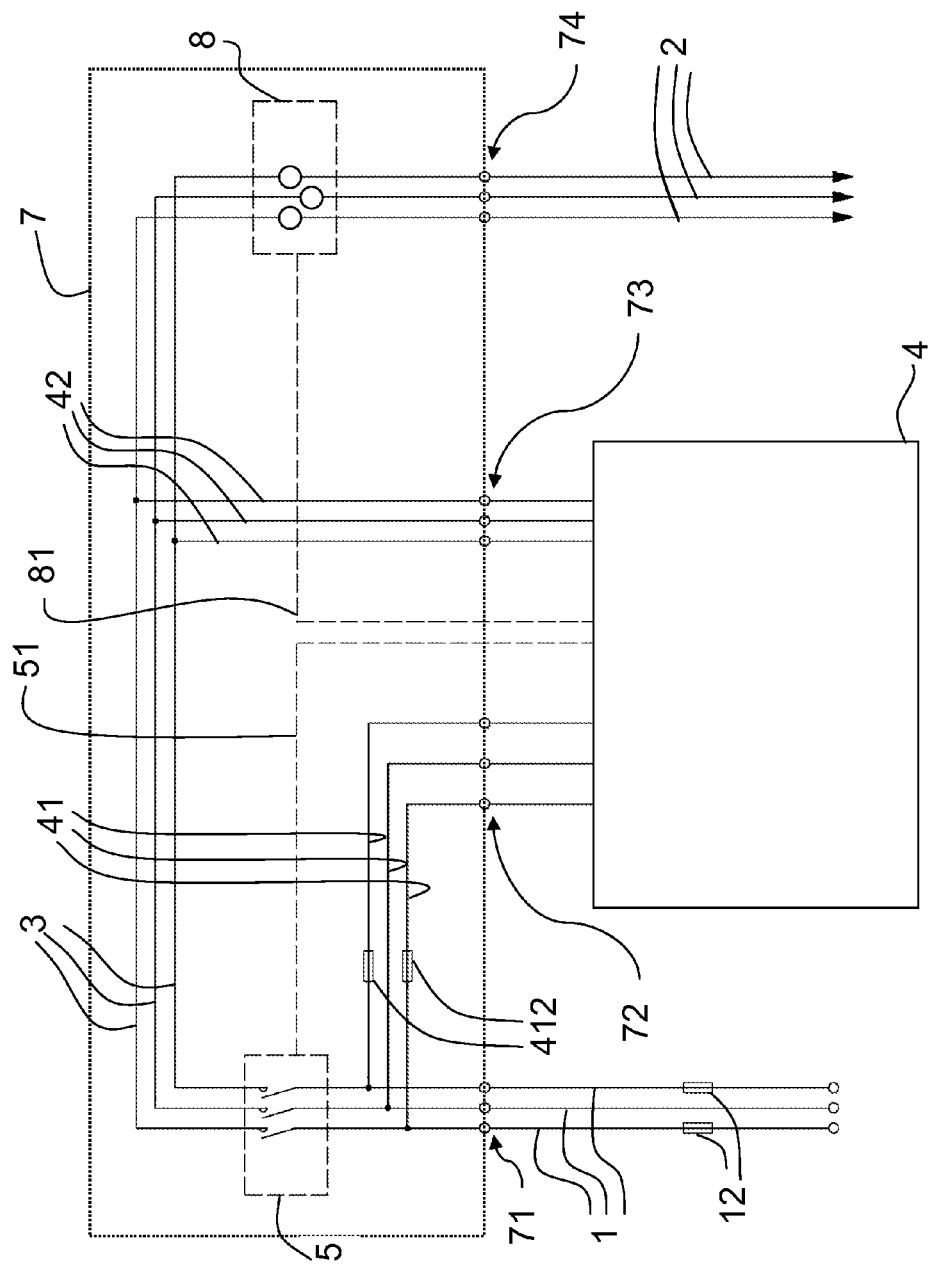
FIG. 1 shows an energy supply system comprising a loop enclosure according to a preferred embodiment.

FIG. 1 shows an energy supply system according to a preferred embodiment. It comprises a grid connector unit 1, which may be connected to an external power grid (not shown in FIG. 1), and a load connector unit 2, which may be connected to an internal building grid (also not shown in FIG. 1). The grid connector unit 1 and the load connector unit 2 shown in FIG. 1 are simple three-phase cables. However, they might include additional elements, such as measurement devices and/or fuses. In the present case, two leads of the three-phase cable making up the grid connector unit 1 are protected by main fuses 12.

The energy supply system further comprises a loop enclosure 7, which is connected between the grid connector unit 1 and the load connector unit 2. The loop enclosure 7 is schematically drawn in as a box with dotted perimeter. It has four electrical connections leading outside of the enclosure, which are all designed for three-phase use. They include a grid connector terminal 71, a charging line terminal 72, a discharging line terminal 73, and a load connector terminal 74. The terminals shown here are all three-phase terminals, as it is a three-phase system. A conductor loop 3 is placed inside the loop enclosure 7, providing an electrical connection between the grid connector terminal 71 and the load connector terminal 74. The discharging line terminal 73 is internally connected to a charging line, while the load connector terminal 74 is internally connected to a discharging line 42.

The loop enclosure 7 encloses also an all-phase disconnector 5 placed in the conductor loop 3. Once the disconnector 5 is activated (as shown in FIG. 1), the electrical connection between the grid connector terminal 71 and the load connector terminal 74 through the conductor loop 3 is cut. While the charging line 41 is connected to the conductor loop 3 at one side of the disconnector 5, the discharging line 42, via input fuses 412, is connected to the other side.

An energy storage device 4 is placed outside the loop enclosure 7 and connected to the charging line terminal 72 and the discharging line terminal 73. The energy storage device 4 may be charged via the charging line terminal 72, while it may be discharged via the discharging line terminal 73. Due to the connection of the charging line 41 and discharging line 42, the energy storage device 4, at least when in a charging mode, bypasses the disconnector 5. Therefore, even when the disconnector 5 is activated, the energy storage device 4 can still discharge through part of the conductor loop 3, through the load connector terminal 74 and the load connector unit 2 into the load grid or building grid.

In addition, the loop enclosure 7 has a built-in output power measurement device 8 connected to the conductor loop 3 near the load connector terminal 74. The output power measurement device 8 here is shown as three separate elements each incorporated into one phase of a three-phase cable. It measures the electrical power supplied to the load connector unit 2 and ultimately to the load grid. Signal lines 51 and 81 lead away from the disconnector 5 and the output power measurement device 8 to the energy storage device 4. Through a disconnector signal line 51, the energy storage device 4 can control the disconnector 5, while it obtains output storage measurements from the output power measurement device 8 through a power measurement signal line 81. The energy storage device 4 can also monitor a voltage level at the grid connector terminal 71 and therefore at the grid connector unit 1 by means of a voltage monitoring device (not shown in FIG. 1), which is part of the energy storage device 4 and connected to the charging line terminal 72.

Figure 2:
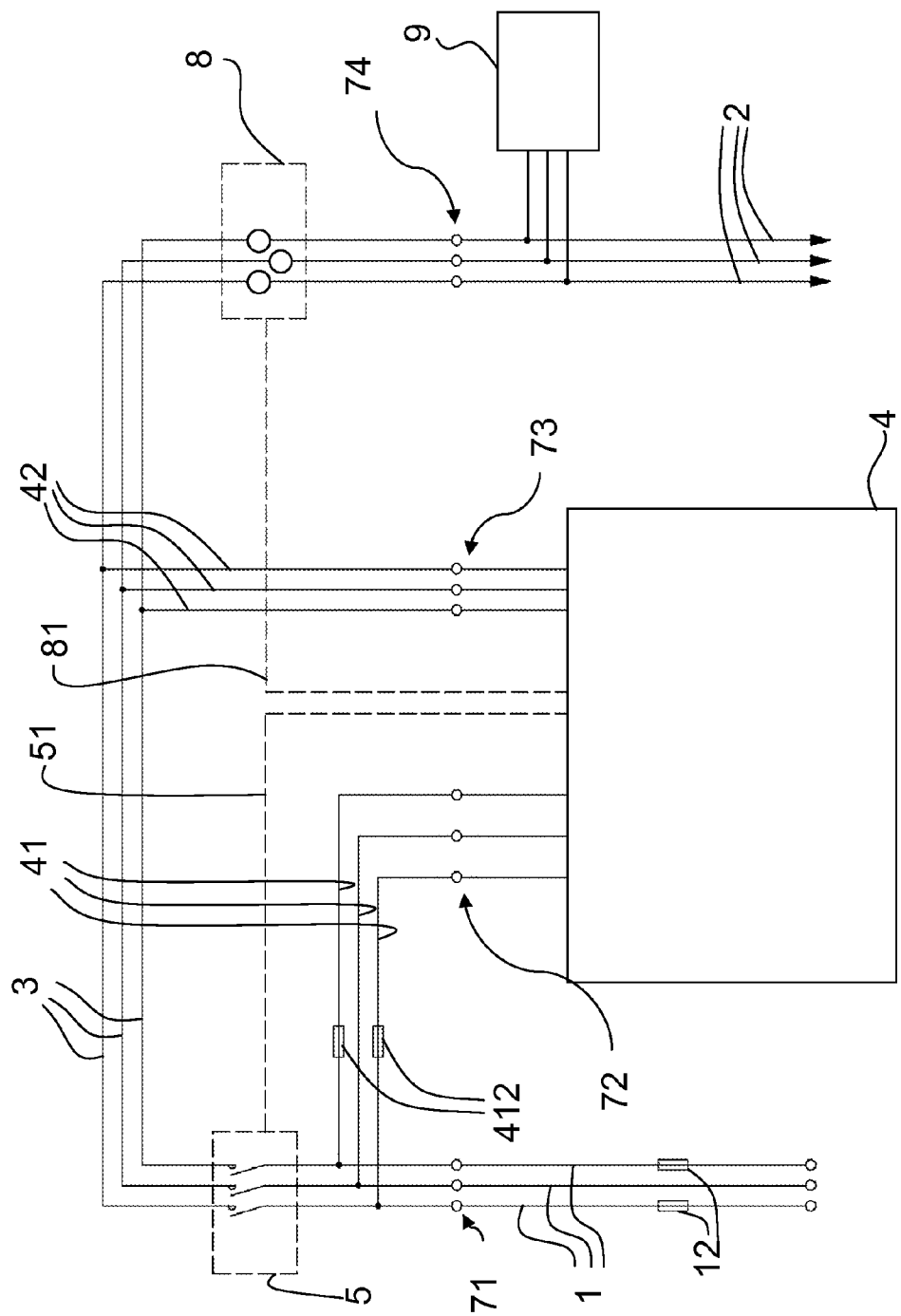
FIG. 2 shows an energy supply system together with a photovoltaic device connected to it according to one preferred embodiment.

FIG. 2 shows a similar energy supply system as in FIG. 1. Here the dotted line indicating the perimeter of the loop enclosure 7 is not shown. In addition, a photovoltaic device 9 is shown being connected to a load side of the energy supply system, i.e. to the load connector unit 2. When the disconnector 5 is activated, the photovoltaic device 9 can still feed into the load grid connected to the load connector unit 2.

Figure 3:
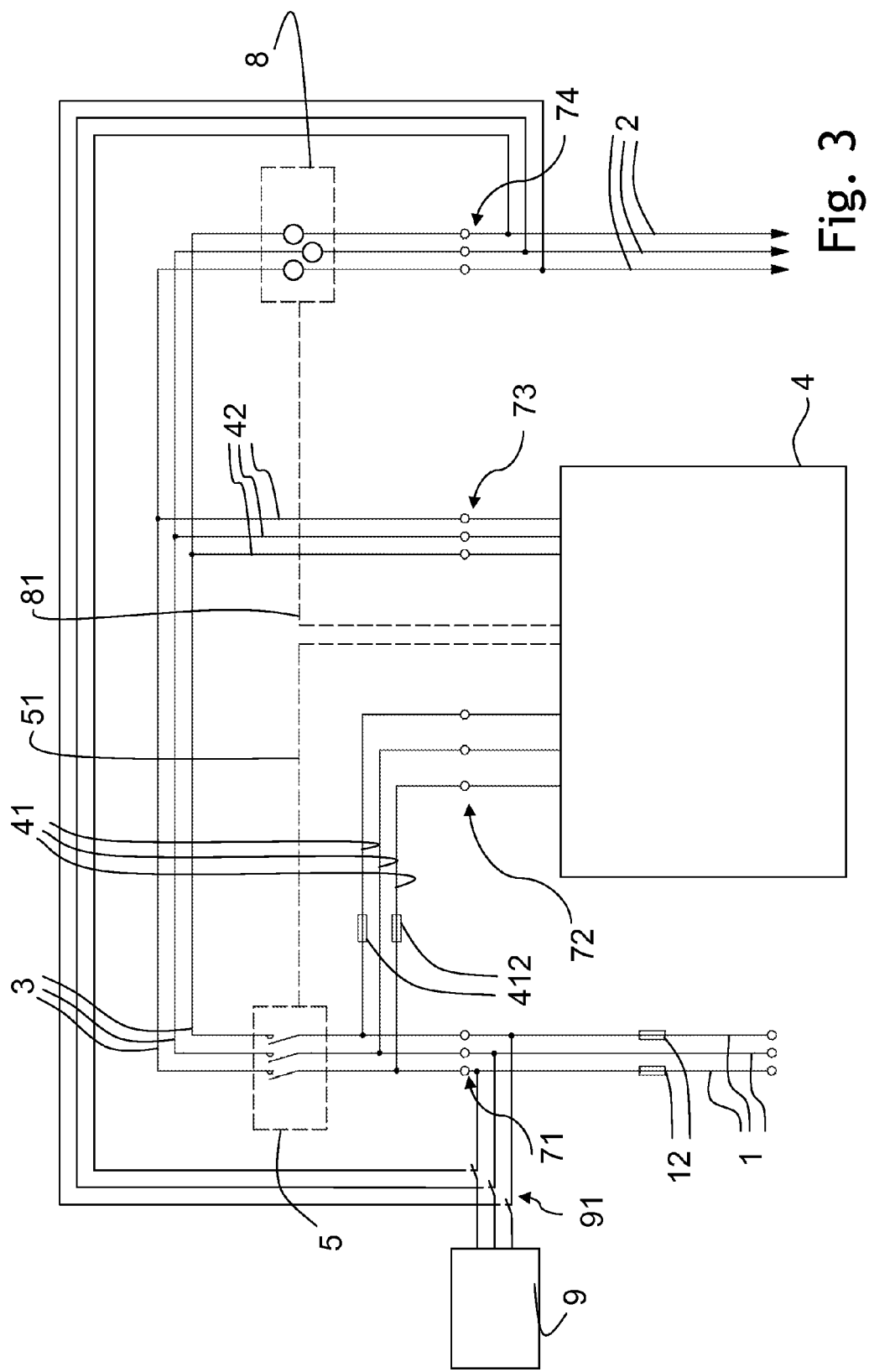
FIG. 3 shows an energy supply system together with a photovoltaic device connected to it according to a different preferred embodiment.

FIG. 3 shows an energy supply system together with a photovoltaic device 9 connected to it according to a different embodiment than shown in FIG. 2. Here, the photovoltaic device 9 is connected to a grid side of the energy supply system, i.e. to the grid connector unit 1. Once the disconnector 5 is activated and the conductor loop 3 is electrically separated from the external power grid, the photovoltaic device 9 also becomes separated from the conductor loop 3 and can no longer supply electricity to the load grid. In order to avoid this situation, a three-phase switch is 91 provided, which connects the output of the photovoltaic device 9 to the load side of the energy supply system, in order to bypass the conductor loop 3. Whenever the disconnector 5 is activated, the switch 91 may be activated as well in order to obtain the same situation as in FIG. 3.

FIG. 4 shows a schematic diagram depicting the placement of the different elements of an energy supply system with respect to a building 6, in particular a private house. In this embodiment, a building connection box 61 is located at an outside wall of the building 6, which is connected to an external power grid 11 via a grid connector unit 1, in this case a cable with a high current capacity. A load connector unit 2 is leading out of the building connection box 61 to an internal building grid, which is not shown in FIG. 4. The loop enclosure 7 is placed near the building connection box 61 and connected to it via extensions of the grid connector unit 1 and the load connector unit 2.

The loop enclosure 7 provides a charging line terminal 72 and a discharging line terminal 73 through which an energy storage device 4 is connected to the conductor loop 3 inside the loop enclosure 7, as shown in FIG. 1. While the loop enclosure 7 is placed outside the building 6 near the building connection box 61, the energy storage device 4 is placed inside the building 6, preferably in a climatized room. As shown in FIG. 4 schematically, the leads leading to the energy storage device 4 inside the building 6 can be made for much lower current ratings than the ones making up the grid connector unit 1 and the load connector unit 2. This increases safety for the occupants of the building and is also more cost efficient.

REFERENCE NUMERALS 1 grid connector unit
11 external power grid
12 main fuses
2 load connector unit
3 conductor loop
4 energy storage device
41 charging line
42 discharging line
421 input fuses
5 disconnector
51 disconnector signal line
6 building
61 building connection box
7 loop enclosure
71 grid connector terminal
72 charging line terminal
73 discharging line terminal
74 load connector terminal
8 output power measurement device
81 power measurement signal line
9 photovoltaic device
91 switch

The invention claimed is:

1. Energy supply system for supplying electrical energy to a building, comprising a grid connector unit for providing a connection to an external power grid, a load connector unit for connecting to a building power grid, a conductor loop for electrically connecting the grid connector unit to the load connector unit, an energy storage device connected to the conductor loop, and a disconnector placed in the conductor loop for, upon activation of the disconnector, disconnecting the electrical connection between the grid connector unit and the load connector unit, whereby the energy storage device is connected to the conductor loop via a discharging line such that electrical energy stored in the energy storage device may be discharged through part of the conductor loop to the load connector unit when the disconnector is activated.

2. Energy supply system according to claim 1, whereby the conductor loop is partially or entirely placed inside a loop enclosure.

3. Energy supply system according to claim 2, whereby the disconnector or an output power measurement device measuring the power reaching the load connector unit or both are placed inside the loop enclosure.

4. Energy supply system according to claim 1, whereby the grid connector unit, the load connector unit, the conductor loop, the disconnector, or the electrical connection between the energy storage device and the conductor loop are constructed as one-phase, two-phase, three-phase or multi-phase elements.

5. Energy supply system according to claim 4, whereby the disconnector is an all-phase disconnector.

6. Energy supply system according to claim 1, further comprising a grid voltage monitoring device for monitoring the voltage level at the grid connector unit.

7. Energy supply system according to claim 6, whereby the disconnector is controlled by the energy storage device in dependence of the result of the monitoring of the voltage level.

8. Energy supply system according to claim 6, whereby the energy storage device is connected to the conductor loop via a charging line such that the connection to the conductor loop is not disconnected when the disconnector is activated.

9. Energy supply system according to claim 8, whereby the disconnector is controlled by the energy storage device in dependence of the result of the monitoring of the voltage level.

10. Energy supply system according to claim 2, whereby the loop enclosure is constructed to be located in an outside environment.

11. Energy supply system according to claim 1, whereby the conductor loop is constructed for a larger current throughput, than the discharging line or any electrical connecting line connecting the energy storage device to the conductor loop.

12. Energy supply system according to claim 1, further comprising a load side connected photovoltaic device.

13. Energy supply system according to claim 1, further comprising a grid side connected photovoltaic device and a switch unit constructed for switching the connection of the photovoltaic device from a grid side connection to a load side connection when the disconnector is activated.

14. Loop enclosure entirely or partly enclosing a conductor loop and a disconnector, and comprising grid connector terminals, load connector terminals, and discharging line terminals, whereby the enclosed conductor loop electrically connects the grid connector terminals to the load connector terminals, whereby the disconnector is constructed to, upon activation, disconnect the electrical connection between the grid connector terminals and the load connector terminals, and whereby a discharging line electrically connects the conductor loop and the discharging line terminals, even when the disconnector is activated.

15. Loop enclosure according to claim 14, further constructed for mounting at an outside of a building.

16. Loop enclosure according to claim 14, further enclosing an output power measurement device measuring the power leaving the enclosure through the load connector terminals.

17. Energy supply system for supplying electrical energy to a building, comprising:
- a loop enclosure placed in proximity of and connected to a building connection box such that a grid connector unit of the building connection box, which grid connector unit provides a connection to an external power grid, is electrically connected to a load connector unit of the building connection box, which load connector unit provides a connection to a building power grid, via a conductor loop enclosed by the loop enclosure,
- a disconnector placed in the conductor loop inside the enclosure for, upon activation of the disconnector, disconnecting the electrical connection between the grid connector unit and the load connector unit,
- an energy storage device connected to the conductor loop via a discharging line such that electrical energy stored in the energy storage device may be discharged through part of the conductor loop to the load connector unit when the disconnector is activated.

18. Energy supply system according to claim 17, whereby the loop enclosure is placed at the outside of the building and the energy storage device is placed inside of the building.

* * * * *